(12) United States Patent
Brinks (10) Patent No.: US 8,623,317 B2
(45) Date of Patent: Jan. 7, 2014

(54) ADJUSTING THE STABILITY OF COMPLEX METAL HYDRIDES

(75) Inventor: Hendrik W. Brinks, Oppegård (NO)

(73) Assignee: Institutt for Energiteknikk, Kjeller (NO)

( * ) Notice: Subject to any disclaimer, the term of this patent is extended or adjusted under 35 U.S.C. 154(b) by 205 days.

(21) Appl. No.: 12/162,304

(22) PCT Filed: Jan. 23, 2007

(86) PCT No.: PCT/NO2007/000025
§ 371 (c)(1),
(2), (4) Date: Dec. 5, 2008

(87) PCT Pub. No.: WO2007/091894
PCT Pub. Date: Aug. 16, 2007

(65) Prior Publication Data
US 2009/0169468 A1    Jul. 2, 2009

(30) Foreign Application Priority Data
Jan. 26, 2006 (NO) .................................. 20060430

(51) Int. Cl.
*C01B 6/24* (2006.01)
*C01B 3/04* (2006.01)
(52) U.S. Cl.
USPC .......... 423/463; 423/464; 423/472; 423/648.1
(58) Field of Classification Search
USPC ......... 423/644, 600, 287, 463, 465, 464, 472, 423/648.1; 420/900
See application file for complete search history.

(56) References Cited

U.S. PATENT DOCUMENTS

| 3,214,288 | A | * | 10/1965 | McGraw ....................... 427/436 |
| 3,734,963 | A |  | 5/1973 | Langer, Jr. et al. |
| 4,152,401 | A | * | 5/1979 | Langer et al. ................ 423/286 |
| 4,155,712 | A | * | 5/1979 | Taschek ........................ 422/239 |
| 5,133,929 | A |  | 7/1992 | Bogdanovic et al. |
| 5,831,103 | A | * | 11/1998 | Knott ............................ 549/504 |
| 6,632,293 | B1 |  | 10/2003 | Aono et al. |
| 2001/0018939 | A1 |  | 9/2001 | Zaluska et al. |
| 2003/0053948 | A1 |  | 3/2003 | Bogdanovic et al. |

(Continued)

FOREIGN PATENT DOCUMENTS

| JP | 53031859 | 9/1978 |
| JP | 2001131604 | 5/2001 |

(Continued)

OTHER PUBLICATIONS

Yin et al. "Functional anion concept: effect of fluorine anion on hydrogen storage of sodium alanate" Physical Chemistry Chemical Physics, 2006, p. 1499-1502.*

(Continued)

*Primary Examiner* — Wayne Langel
*Assistant Examiner* — Syed Iqbal
(74) *Attorney, Agent, or Firm* — Husch Blackwell LLP (57) ABSTRACT

The invention relates to a material for reversible hydrogen storage comprising a complex hydride based on one or more anions selected among $BH_4^-$, $MgH_3^-$, $MH_4^-$ and $MH_6^{3-}$ (M=Al, Ga, In), and one or more cations, where the material has obtained amended stability due to substitution of the complex hydride phase itself.
The invention also relates to a process for preparation of the material and use thereof, and a process for reversible hydrogen storage.

14 Claims, 5 Drawing Sheets

(56) References Cited

U.S. PATENT DOCUMENTS

| | | | |
|---|---|---|---|
| 2004/0009121 A1* | 1/2004 | Jensen et al. | 423/648.1 |
| 2004/0247521 A1 | 12/2004 | Bogdanovic | |
| 2006/0046930 A1* | 3/2006 | Au | 502/400 |

FOREIGN PATENT DOCUMENTS

| | | |
|---|---|---|
| JP | 2002-126506 | 5/2002 |
| JP | 2002526255 | 8/2002 |
| JP | 2004196634 | 7/2004 |
| JP | 2005512793 | 5/2005 |
| JP | 2006205148 | 8/2006 |
| SU | 562507 A | 8/1977 |

OTHER PUBLICATIONS

Brinks et al. "Synchrotron X-ray and neutron diffraction studies of NaAlH4 containing Ti additives", 2003, journal of Alloys and compounds, 215-221.*

Majzoub et al. "Compound Formation in Ti-doping of Sodium Aluminum Hydride", Dec. 2003, Lawerence livermore national laboratory.*

CAS reg. nr. 111549-03-2.

CAS reg. nr. 77402-47-2.

CAS reg. nr. 77371-28-9.

CAS reg. nr. 77371-26-7.

European Search Report for related patent application No. PCT/NO2007000025 dated Mar. 16, 2012.

Wang et al., Improved Hydrogen Storage of TiF3-Doped NaAlH4. Chemphyschem, vol. 6, No. 12, Dec. 9, 2005, pp. 2488-2491.

Brinks et al., Synchrotron X-ray and Neutron Diffraction studies of NaAlH4 containing Ti additives, Journal of Alloys and Compounds, Elsevier Sequoia, Lausanne, CH, vol. 376, No. 1-2. Aug. 11, 2004, pp. 215-221.

A. Bouamrane et al., Structural characterization of NaMgH2F and NaMgH3, Materials Research Bulletin, 2000. vol. 35, pp. 545-549.

A. Bouamrane et al., Standard enthalpies of formation of sodium-magnesium hydride and hydriofluorides NaMgH3, NaMgH2F and NaMgF2H, Thermochimica Acta, 1999, vol. 326, pp. 37-41.

Official Action for related Japanese application No. 2008-552260 dated Nov. 21, 2012.

Anton, Hydrogen Desorption Kinetics in Transition Metal Modified NaAlH, 2003 Elsevier, Jun. 1, 2002, pp. 2-6.

Notification of Reasons for Rejection for related JP Patent App. No. 2008-552260.

A.Fossdal et al., "Pressure-Composition Isotherms . . . " Journal of Alloys and Compounds (2005), 397(1-2), 135-139.

P.Wang et al., "Direct Formation of . . . ", Applied Physics Letters (2005), 87(7), 071911/1-071911/3.

P.Wang et al., "Improved Hydrogen Storage of TiF3—doped NaAlH4", ChemPhysChem 2005, 6, 2488-2491.

\* cited by examiner

ADJUSTING THE STABILITY OF COMPLEX METAL HYDRIDES

FIELD OF INVENTION

The present invention relates to material for reversible hydrogen storage.

The invention also relates to a process for preparation of the material.

The invention also relates to use of the material.

Finally the invention relates to a process for reversible hydrogen storage.

BACKGROUND OF THE INVENTION

Restricted amounts of fossil fuels, such as oil and natural gas, have stimulated considerable efforts to find alternative energy sources and alternative energy carriers. Hydrogen is of great interest as energy carrier due to its high energy density and because, like electricity, it can be produced in several ways without any influence on the user of the hydrogen. Energy can be stored much easier in large quantities as hydrogen than electric energy.

As a chemical fuel, hydrogen is unique because the reaction product of a fuel cell or internal-combustion engine will be pure water and will not result in any local pollution. This gives a potential as to environmental benefits, since either can hydrogen be produced from renewable energy or the $CO_2$ generated as bi-product in the hydrogen production can be deposited from centralized production facilities.

The storage of hydrogen gas is nevertheless a challenge, which may be accomplished under high pressure or as liquid hydrogen (−250° C.). This is, however, energy demanding and impractical, and therefore the attention is focused on the storage of hydrogen in solid substances which absorb hydrogen in their crystal lattice. This hydrogen is released by increasing the temperature, and the effort is concentrated on obtaining the largest possible hydrogen density in respect of weight and volume, and on obtaining satisfactory kinetics and costs.

Many so called interstitial metal hydrides have been made, in which hydrogen molecules are absorbed and distributed in cavities in the metal structure as single atoms, but such hydrides have so far not been able to store more than about 2.5% by weight of hydrogen. On the other hand, an other group of metal hydrides, so called complex metal hydrides, has been found to achieve higher gravimetric densities. These hydrides have complexes of a metal atom surrounded by hydrogen, $AlH_4^-$ for example, incorporated into their crystal structure. Some of these hydrides have been known for more than 40 years and have been brought into extensive use as reduction agents, for example $LiAlH_4$ and $NaBH_4$. It has recently become known that by the use of titanium based additives, the kinetics of the dehydrogenation could be considerably improved, and rehydrogenation could be possible under moderate conditions for $NaAlH_4$ and $Na_2LiAlH_6$. U.S. Pat. No. 6,106,801 to Bogdanovic and Schwickardi, used herein as reference, added Ti accelerator, i.a. by impregnating with $Ti(OBu)_4$ (Bu=Butoxide) in a dietylether suspension.

More recently it has been attempted to improve the kinetics by mixing the accelerator, which is often titanium based, with the complex hydride by ball milling. The more intimate mixture and the reduced particle size contribute to improved kinetics. Further, Ti compounds with a small particle size have been found to improve the kinetics [M. Fichtner et al NanoTech. 14 (2003) 778, B. Bogdanovic et al Adv. Mat. 15 (2003) 1012]. The exact reason why particularly Ti, but also other transition metals and graphites, has such effect on the kinetics is not known, but it is now an established fact that most of the titanium is, independent of its mode of addition, reduced to metallic titanium and is then bonded up in a metastable $Al_{1-x}Ti_x$ alloy with x<0.25 [H. W. Brinks et al. J. Alloys Compd. 376 (2004) 215]. One of the causes of the kinetic problems is that complex hydrides often involve two or more solid phases in dehydrogenated or rehydrogenated state so that diffusion of metal containing species is necessary in order that the reactions shall take place.

Novel groups of reversible complex hydrides have also emerged; both amides/imides of light cations such as lithium [P. Chen et al Nature 420 (2002) 302] and boron hydrides such as $LiBH_4$. The temperature for dehydrogenation/rehydrogenation is, however, slightly higher and the kinetics, especially for the boron hydrides, is for the present inferior to Al-based complex hydrides. The potential expressed as % by weight is, however, higher for these two groups.

Bonds in interstitial metal hydrides are often via delocalized electron systems, and it is well known that one by amending the metal composition may tune the thermodynamic properties considerably; i.e. amend temperature/pressure conditions for hydrogen uptake/release. This is for example obvious for Ni which only forms hydrides at very high pressures, but by adding ⅙ La to $LaNi_5$ one may, at a pressure of a few bars and at room temperature, form $LaNi_5H_6$.

Complex hydrides appear to contain more ionic bonds between the complex anion and the counter-ion. This lends less flexibility to amend compositions, as opposed to interstitial metal hydrides where metallic bonds lend considerably more scope for this.

There are also examples of hydrogen uptake in transition metal halides, resulting in interstitial metal hydrides, for example $ThI_2$ into $ThI_2H_{0.7}$ and $ThI_2H_{1.7}$ [A. W. Struss, J. D. Corbett, Inorg. Chem. 20 (1978) 965]. This happens by a different pressure than metallic Th and demonstrates that stabilization adjustments by halogenides may be obtained also for other types of metal hydrides.

For complex hydrides there exists only one known and well characterized example of a possible substitution of the cations, namely by substituting ⅓ of Na in $Na_3AlH_6$ with Li so that $Na_2LiAlH_6$ is obtained [H. W. Brinks et al. J. Alloys Compd. 392 (2005) 27]. This increases the stability of an already far too stable compound and there are no possibilities of gradual adjustment of the Li-content of the phase. $LiMg(AlH_4)_3$ has also been characterized, but structure and stability of this compound are not known.

A theory on the mechanism of titanium for increased reversibility of $NaAlH_4$ was a solid solution on Na or Al position [D. L. Sun et al J. Alloys Compd. 337 (2002) L8], which would result in that the thermodynamic stability was amended. However, intensive studies with a great selection of samples with synchrotron X-ray diffraction and neutron diffraction give no indication of alteration of the crystal lattice [H. W. Brinks et al. J. Alloys Compd. 376 (2004) 215]. Further, measurements of pressure-composition isotherms show, under approximate equilibrium conditions for $Na_2LiAlH_6$ at a temperature so high that Ti accelerator is not necessary, concurrent equilibrium pressures [J. Graetz et al. Phys. Rev. B 71 (2005) 184115] for samples with and without addition of Ti.

A possibility to circumvent this problem has recently been suggested by adding thermodynamic favourable side reactions which contribute to lower the stability of the total reaction [J. J. Vajo et al. J. Phys. Chem. B 109 (2005) 3719]. The reaction $LiBH_4 = B + LiH + \frac{3}{2}H_2$ was for example destabilized by adding $MgH_2$ so that $MgB$ was formed: $LiBH_4 +$ $MgH_2=MgB+LiH+5/2H_2$. This does not effect the stability of the $LiBH_4$ phase itself, but the side reaction $MgH_2+B=MgB+H_2$ changes the thermodynamic characteristics of the total reaction. A disadvantage of this method is that many phases are involved with two condensed phases on either side of the reaction equation. Moreover, the temperature must go up to about 300° C. where $LiBH_4$ is in molten state and where catalyzed $MgH_2$ merely by its high % by weight has appropriate equilibrium pressure and excellent kinetics.

But even though $NaAlH_4$ theoretically gives 5.6% by weight hydrogen in a two-step reaction, $LiNH_2+2LiH$ gives 10.2% by weight hydrogen and $LiBH_4$ gives 13.9% by weight hydrogen, the kinetics of both dehydrogenation and rehydrogenation, and the temperature by which the reaction takes place, are still not satisfactory for hydrogen storage systems for inter alia vehicles. It is therefore substantial room for improvement of hydrogen storage in solid materials.

SUMMARY OF THE INVENTION

By this invention a material for reversible hydrogen storage is provided. The material is capable of, effectively and cyclic, to store and release great quantities of hydrogen. More specifically, the invention relates to metal hydrides and how, by substitutions, one can give these the proper thermodynamic qualities that are necessary in hydrogen storage systems.

The metal hydrides have novel and improved hydrogen storage characteristics, so that pressure/temperature at dehydrogenation is suitable for hydrogen storage systems in for example vehicles. The invention represents a new generation of metal hydrides. By accomplishing substitution of the complex hydride phase itself, the thermodynamic characteristics of the metal hydrides may be amended so that the temperature for a given pressure is changed.

The invention particularly relates to substitution of hydrogen with halogen in the complex hydride phase itself.

The invention also relates to a process for the preparation of the said material.

Further the invention relates to the use of the material.

Finally the invention relates to a process for reversible hydrogen storage.

DETAILED DESCRIPTION OF THE INVENTION

The invention relates to metal hydrides of complex type, i.e. that they are based on anions containing Al, N, B, Ga, In or Mg surrounded by hydrogen, for example by the structural units $AlH_4^-$, $AlH_6^{3-}$, $NH_2^-$, $NH^{2-}$, $BH_4^-$ and $MgH_3^-$ or combinations thereof. In addition the compounds contain cations, preferentially of the light type. By substituting halogen thereinto, metal hydrides which have previously been precluded because of unfavourable thermodynamics may once again have the possibility to be used in practice. Fluorine is the most favourable of the halogens because of its similarity, in size, to hydrogen and because it is the lightest halogen.

The material according to the invention comprises a complex hydride based on one or more anions selected among $BH_4^-$, $MgH_3^-$, $MH_4^-$ and $MH_6^{3-}$ (M=Al, Ga, In), and one or more cations, wherein the material has gained amended stability due to partly substitution of anion-hydrogen with halogen in the complex hydride phase itself.

In one embodiment of the material according to the invention, the halogen is selected among fluorine, chlorine and bromine.

In a further embodiment of the material according to the invention the cation or cations is/are selected among alkali metals, alkaline-earth metals, transition metals, lanthanoids, Al and Ga.

In a further embodiment of the material according to the invention, the cation or cations is/are selected among alkali metals, alkaline-earth metals, 3d transition metals and Al.

In a further embodiment of the material according to the invention, the cation is Li.

In a further embodiment of the material according to the invention, it comprises one or more combinations of complex ions or of complex ions and interstitial hydrogen.

In a further embodiment of the material according to the invention, it comprises complex ions that are interconnected, so that total composition and charge differ from the isolated complex ions.

The process for preparation of the material according to the invention comprises to mix metal halogenide with dehydrogenated product followed by rehydrogenation.

According to the invention the material is used for reversible hydrogen storage in hydrogen storage systems.

The hydrogen storage systems are particularly used for vehicles.

As mentioned, the invention also relates to a process for reversible hydrogen storage by use of a material comprising a complex hydride based on one or more anions selected among $BH_4^-$, $MgH_3^-$, $MH_4^-$ and $MH_6^{3-}$ (M=Al, Ga, In), and one or more cations, where the stability is amended due to partly substitution of anion-hydrogen with halogen in the complex hydride phase itself.

In one embodiment of the process according to the invention, the halogen is selected among fluorine, chlorine and bromine.

In a further embodiment of the process according to the invention the cation or cations is/are selected among alkali metals, alkaline-earth metals, transition metals, lanthanoids, Al and Ga.

In a further embodiment of the process according to the invention the cation or cations is/are selected among alkali metals, alkaline-earth metals, 3d transition metals and Al.

In a further embodiment of the process according to the invention, Li is used as cation.

In a further embodiment of the process according to the invention, the material being used comprises one or more combinations of complex ions or of complex ions and interstitial hydrogen.

In a further embodiment of the process according to the invention, the material being used comprises complex ions that are interconnected so that total composition and charge differ from the isolated complex ions.

The substitution of the complex hydride phase may be from 0.01 to 70%.

Metal hydrides of complex type in relation to the present invention are as mentioned above based on anions with Al, N, B, Mg, Ga, In as core atom surrounded by hydrogen, i.e. complex ions, and with kation as counter ion. These complex ions can be isolated tetrahedrons such as $AlH_4^-$ and $BH_4^-$, isolated octahedrons such as $AlH_6^{3-}$ or smaller units such as N bonded to one or two atoms so that they form $NH^{2-}$ and $NH_2^-$. Moreover the metal hydrides may consist of interconnected polyhedrons as for example $BaAlH_5$ consisting of chains of $AlH_6$ octahedrons where two of the corners of an octahedron are shared with a respective other octahedron, giving a total composition and charge $AlH_5^{2-}$ [Q. A. Zhang et al. Inorg. Chem. 41 (2002) 6941]. Similarly, $NaMgH_3$ has a three-dimensional network of $MgH_6$ octahedrons where all corners are shared with an other octahedron [E. Rønnebro et al. J. Alloys Compd. 299 (2000) 101]. Thus the total composition and charge will be $MgH_3^-$. Other possibilities are for example binding of $MgH_6$ into $[3MgH_3]^{3-}$ clusters as in $CsMgH_3$, which also gives the same total composition and charge [G. Renaudin et al. J. Alloys Compd. 353 (2003) 175]. Moreover, complex hydrides may be combined, and $Li_3(BH_4)(NH_2)_2$ has for example been reported to be prepared, but the exact structure has not been determined [F. E. Pinkterton et al. J. Phys. Chem. B 109 (2005) 6]. In addition, in some cases it is possible to combine complex ions and hydrogen which can be viewed as being of interstitial type; $Sr_2AlH_7$, for example, consists of $AlH_6$ octahedrons and single hydrogen bonded to Sr [Q. A. Zhang et al. Inorg. Chem. 41 (2002) 6547]. In an embodiment this invention comprises partly substitution, preferably from 0.01 to 70%, of hydrogen with halogen in all variants of such complex metal hydrides, in both isolated complex ions, coupled complex ions or combination of several complex ions, or complex ions and interstitial hydrogen.

The core atom of complex ions is chosen among Mg, B, Al, Ga, In and N. These may also be combined. The counter ion (cation) may be one or more selected among alkali metals, alkaline-earth metals, transition metals, lanthanoids, Al and Ga and may particularly be chosen among the alkali metals, the alkaline-earth metals, the 3d transition metals and Al. All halogens or combination of halogens may be substituted for hydrogen in the complex ions. Fluorine, chlorine and bromine are preferably used and particularly is used fluorine which will give the smallest reduction of gravimetric capasity.

The thermodynamic stability of the complex hydrides can be adjusted by replacing from 0.01 to 70% of the anionhydrogen with halogen selected among fluorine, chlorine and bromine, particularly fluorine.

Dehydrogenation of the complex hydrides can be carried out by a temperature from 0 til 300° C., particularly from 0 til 200° C., and by a pressure from 0 to 700 bar, preferably from 0 til 200 bar, particularly from 0 til 120 bar.

Further, general substitution of Li in Li-containing complex hydrides with Ni, Cu, Co, Ag and In may also adjust the thermodynamic stability of these complex hydrides. This is also the case for complex hydrides without halogen substitution. The substitution may be from 0.01 to 70%.

The complex hydrides according to the invention can inter alia be synthesized by mixing a halogenide with a dehydrogenated product, and then re-hydrogenate. $Na_3AlH_{6-x}F_x$ can for example be prepared from NaF, Al and $TiF_3$ catalyst in $H_2$ at a temperature from ambient temperature to 250° C., particularly from 80° C. to 150° C. Thus, the complex hydrides which comprise halogen are just as simple to synthesize as the pure complex hydrides without halogen. The materials are typically in powder form during the mixing, but may both in initial production of the hydride phase and later during cycling exist in molten state.

By addition of halogen so that this is absorbed up by the hydride phase, the stability of the hydride phase is amended, and at the same time the dehydrogenation product is amended. By adding for example fluorine to $Na_3AlH_6$ the equilibrium reaction can be amended from to In this example, $Na_3AlH_6$ is exchanged with $Na_3AlH_3F_3$, and at the same time NaH is exchanged with NaF. Both affect pressure/temperature conditions for release/absorption of hydrogen, so that the addition of halogen, here fluorine, results in a destabilization or stabilization of reaction 1. The halogen containing desorption product is a result of halogen in the hydride phase. Because alkali metal halogenides generally are more stable than their corresponding hydrides, considerably destabilization of the complex hydride phase is expected (left side of reaction ½) unless the bonding conditions due to halogen in the hydride phase itself stabilize this phase even more. In this case, reduced stability is observed (lower dehydrogenation enthalpy) for the total reaction and an increase of plateau pressure at about 100° C. with a factor of 5-10. In this example one has thus obtained destabilization of the hydride phase itself by substituting hydrogen with fluorine. It is on the other hand probable that an opposite effect may be obtained with other metal compositions, namely stabilization of the complex hydride by substitution of hydrogen with halogen. The similarity between hydrides and fluorides is moreover previously known and several mixed compounds may probably be made, which also appears from the following examples.

EXAMPLES

As an example, NaF (730 mg) and Al powder (160 mg) were mixed with $TiF_3$ catalyst (53 mg) (molar ratio 3:1:0.08) in Ar atmosphere and mechanically milled/crushed in a planetary ball mill of the type Fritsch P7 with ball to powder mass ratio of 20:1. The ball milling was carried out under Ar atmosphere at room temperature for three hours at a speed of 700 rpm. After milling, about 600 mg of the powder (in argon atmosphere) was transferred to a sample container made of stainless steel where hydrogen was added to the sample under pressure. This was carried out in a Sievert's apparatus with calibrated volumes, very stable temperature and very accurate manometers, so that the hydrogen absorption could be exactly measured. Sample containers were evacuated and then heated to 120° C. The pressure of the system was then increased to 73 bar, and after 10 hours the pressure had decreased to 72.4 bar because of adsorption of hydrogen in the sample. Based on detailed calculations from volumes, temperatures, pressures and compressability, it was found that the average hydrogen absorption was 2H per Al, i.e. an x of about 4 if all NaF and Al react to $Na_3AlH_{6-x}F_x$.

Figure 1:
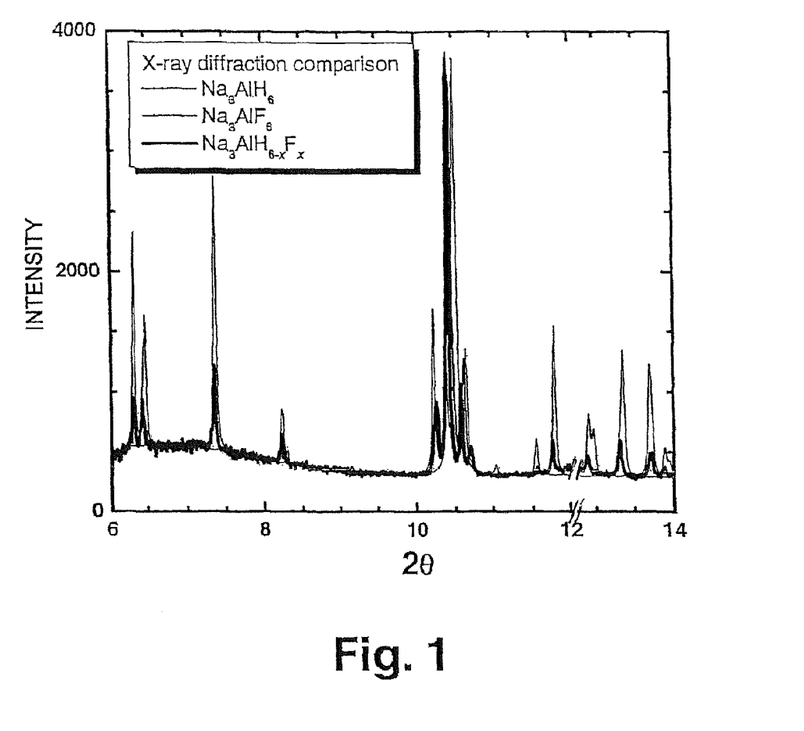
FIG. 1 shows X-ray diffraction diagrams of $Na_3AlH_{6-x}F_x$ and $Na_3AlH_6$. It is clear that the fluorine containing compound has several peaks with considerable intensity and consequently that fluorine has been absorbed in the phase itself.

X-ray diffraction of this sample (see FIG. 1) clearly demonstrates that even though the structure is of the same type as $Na_3AlH_6$, there are distinctive differences in that new reflections gain intensity. From FIG. 1 it appears that $Na_3AlH_{6-x}F_x$ is something between $Na_3AlH_6$ and $Na_3AlF_6$.

Figure 2:
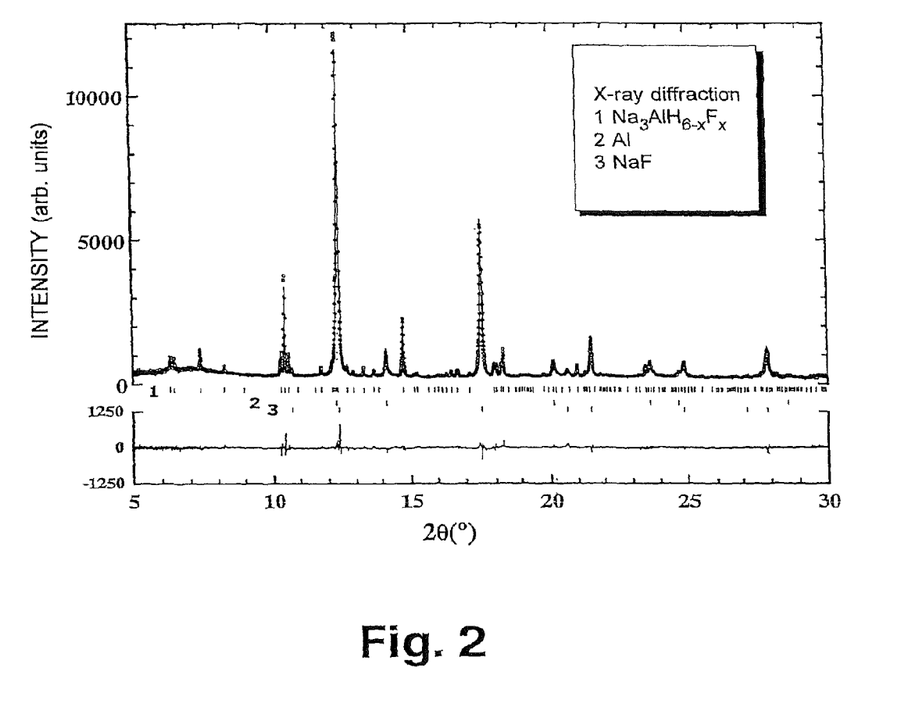
FIG. 2 shows an X-ray diffraction diagram of $Na_3AlH_{6-x}F_x$, where positions and intensities are completely adapted by Rietveld refinement. The figure shows the desired phase (x=4) and residues of unreacted reactants.
Figure 3:
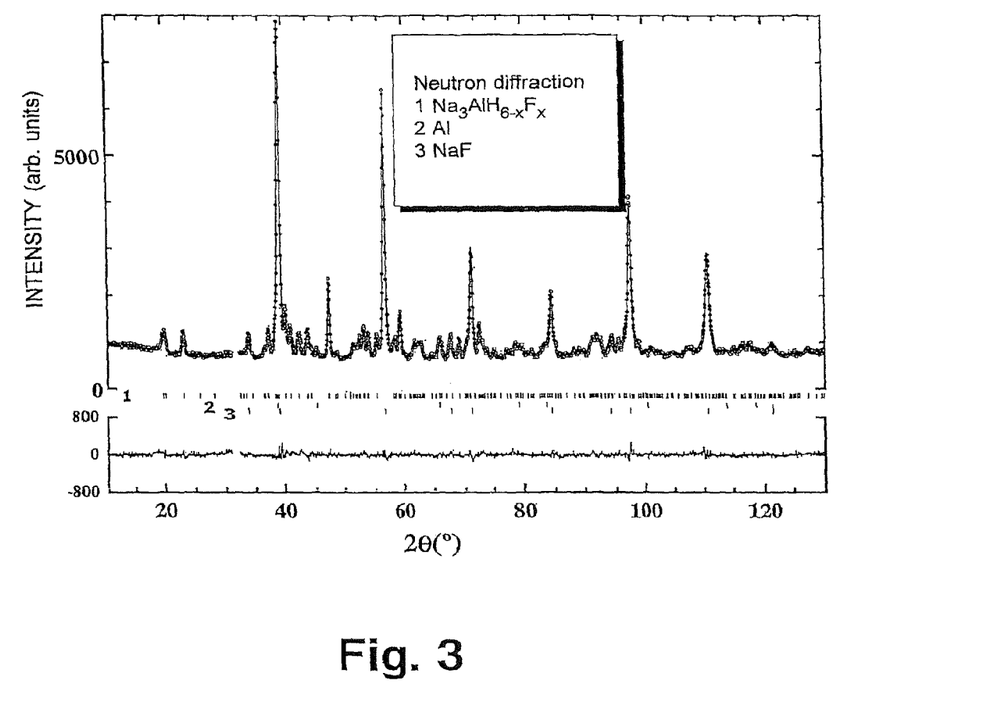
FIG. 3 shows a neutron diffraction diagram of $Na_3AlD_{6-x}F_x$, where positions and intensities are completely adapted by Rietveld refinement. The figure shows the desired phase and residues of unreacted reactants. For the desired phase, also here is x=4.

By the use of synchrotron X-ray diffraction (FIG. 2) and neutron diffraction (FIG. 3) together with Rietveld analysis, complete crystal structure can be determined with all atom positions and number of atoms. Both methods give, independently of each other, the same result: for this sample x is about 4, i.e. that $Na_3AlF_4H_2$ has been synthesized.

Figure 4:
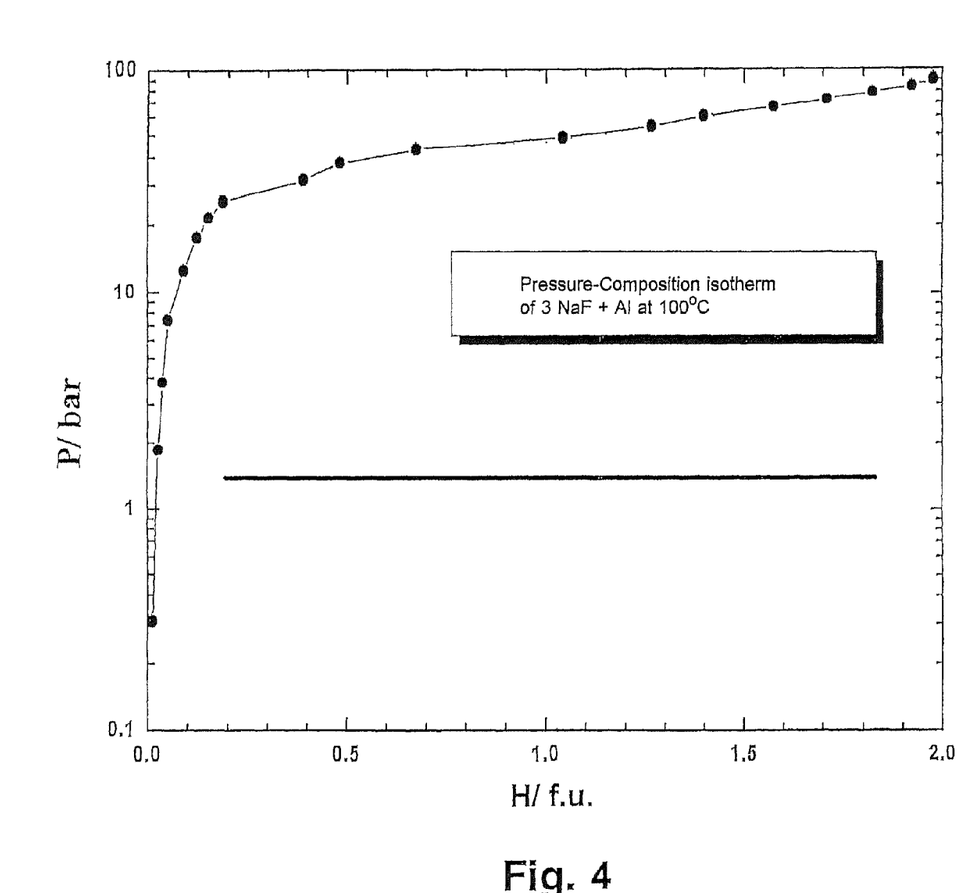
FIG. 4 shows pressure-composition isotherm of $Na_3AlH_{6-x}F_x$ compared to literature data of $Na_3AlH_6$. The difference is considerable; the stability has been lowered by fluorine.

The stability of this complex metal hydride was studied at 100° C. with the Sievert's apparatus (FIG. 4), where the equilibrium pressure of metal hydrides can be found by amending the hydrogen quantity of the entire system in small steps and thereby adjust new equilibrium with a somewhat amended composition of the metal hydride, so that equilibrium pressure is obtained (if waiting long enough to adjust equilibrium) as function of composition. When going from a hydrogen containing phase to another through a two-phase area, a flat area also known as plateau pressure is obtained. The plateau pressure increases with the temperature (for endothermic dehydrogenations being relevant for use with reversible metal hydrides) and is for $Na_3AlH_6$ reported to be about 1 bar at 110° C. [K. J. Gross et al J. Alloys Compd. 330 (2202) 683]. The plateau pressure of $Na_3AlF_4H_2$ is thus considerably higher than the plateau pressure of $Na_3AlH_6$, and a destabilizing of $Na_3AlH_6$ with fluorine is obvious. The pressure is higher than that of $Na_3AlH_6$ both under dehydrogenation and rehydrogenation.

Figure 5:
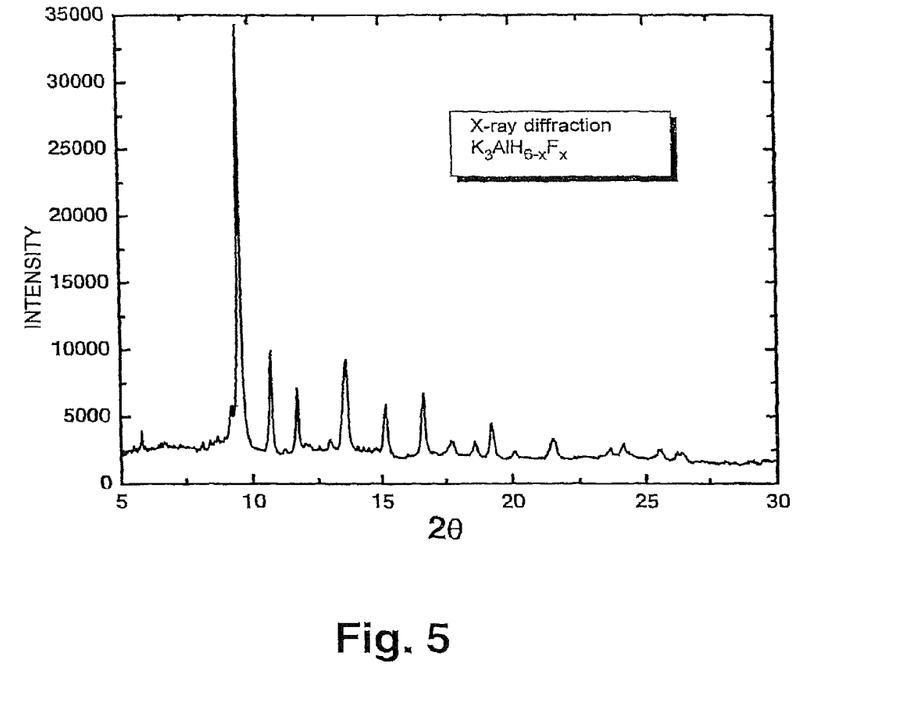
FIG. 5 shows an X-ray diffraction diagram of $K_3AlH_{6-x}F_x$, (with x being about 3), in addition to residues of KF and Al.

Another example of adsorption of fluorine in the phase itself of complex hydrides is $K_3AlH_{6-x}F_x$ which similarity was synthesized from KF, Al and $TiF_3$. A pressure reduction was observed at 120° C. and 60 bar. Synchrotron X-ray diffraction (FIG. 5) clearly shows that fluorine has been adsorbed in $K_3AlH_6$, thereby obtaining $K_3AlH_{6-x}F_x$ where x is about 3. The crystal structure has inter alia expanded with 4.2% from $K_3AlH_6$. Substitution of hydrogen with fluorine in complex hydrides is therefore not unique to $Na_3AlH_6$, and also for this compound it is assumed that fluorine will result in an amendment of the stability conditions, but the stability of $K_3AlH_6$ is not known.

INDUSTRIAL APPLICABILITY

The material according to the invention is particularly useable for vehicles because of the significance of high gravimetric density of hydrogen.

It may also be relevant to stationary storages as for example hydrogen filling stations or as hydrogen storage of isolated energy plants.

The invention claimed is:

1. A material for reversible hydrogen storage, which comprises a solid complex metal hydride based on one or more anions selected from the group consisting of $BH_4^-$, $MH_4^-$ and $MH_6^{3-}$ where M is one member selected from the group consisting of Al, Ga and In, and one or more cations selected from the group consisting of alkali metals, alkaline earth metals, transition metals, lanthanoids, and Ga, where the material is substituted in part of the total number of anion-hydrogens with a halogen in the complex metal hydride and therefore has reduced stability.

2. The material according to claim 1, wherein halogen is selected from the group consisting of fluorine, chlorine and bromine.

3. The material according to claim 1, wherein the cation or the cations is/are selected from the group consisting of alkali metals, alkaline-earth metals and 3d transition metals.

4. The material according to claim 1, wherein the cation is Li.

5. The material according to claim 1, where the complex metal hydride is substituted from 0.01 to 70% molar percentage.

6. The material according to claim 1, comprising one or more combinations of complex metal hydride ions or of complex metal hydride ions and interstitial hydrogen.

7. The material according to claim 1, comprising complex metal hydride ions that are interconnected, so that total composition and charge differ from the isolated complex metal hydride ions.

8. A process for the preparation of a material for reversible hydrogen storage, which comprises a complex metal hydride based on one or more anions selected from the group consisting of $BH_4^-$, $MH_4^-$, and $MH_6^{3-}$, where M is one member selected from the group consisting of Al, Ga, and In, and one or more cations selected from the group of alkali metals, alkaline earth metals, transition metals, lanthanoids, Al and Ga, where the material has reduced stability as a result of a substitution, comprising the steps of mixing a metal halogenide with a dehydrogenated product and rehydrogenating and substituting in part of the total number of anion-hydrogens with a halogen in the complex metal hydride during said steps of mixing and rehydrogenating.

9. The process according to claim 8, where halogen is selected from the group consisting of fluorine, chlorine and bromine.

10. The process according to claim 8, where the cation is selected from the group consisting of alkali metal, alkaline-earth metals, 3d transition metals, Al, and mixtures thereof.

11. The process according to claim 8, where Li is selected as cation.

12. The process according to claim 8, where the complex metal hydride is substituted from 0.01 to 70% molar percentage.

13. The process according to claim 8, where the material comprises one or more combinations of complex metal hydride ions or of complex metal hydride ions and interstitial hydrogen.

14. The process according to claim 8, where the material comprises complex metal hydride ions that are interconnected so that total composition and charge differ from the isolated complex metal hydride ions.

* * * * *